April 8, 1930. S. PAUL 1,753,426
TIE ROD FASTENING
Filed March 22, 1926
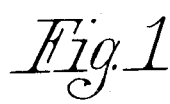
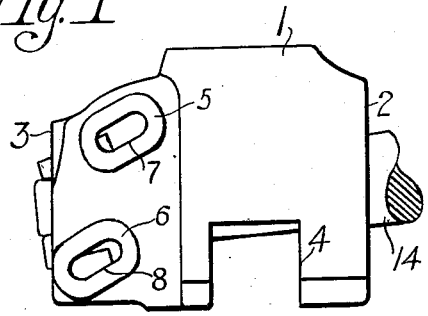
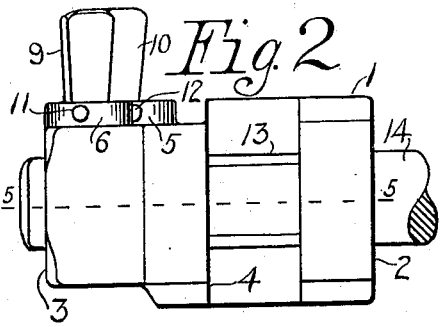
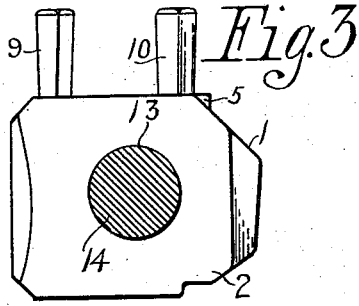
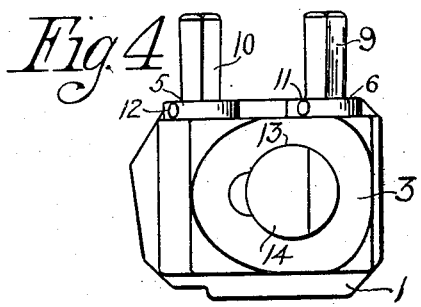
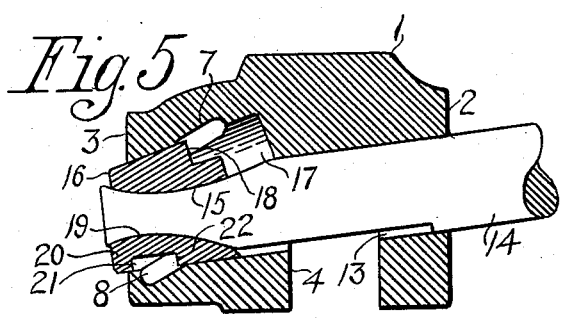
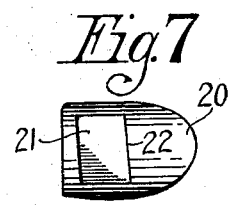
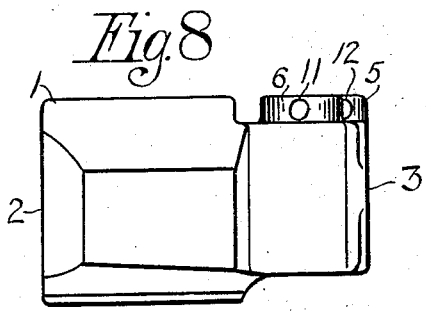
Inventor
Stephen Paul,
By Samuel H. Davis.
Attorney Patented Apr. 8, 1930

1,753,426

UNITED STATES PATENT OFFICE

STEPHEN PAUL, OF LANSING, MICHIGAN

TIE-ROD FASTENING

Application filed March 22, 1926. Serial No. 96,593.

This invention relates to tie rod fastenings, and it belongs to that class of contrivances designed to secure the ends of rods against displacement when subjected to repeated strains, blows or jolts. While this invention may be used as a fastening means for rods employed in any mechanical service, it is especially and advantageously adapted as a tie rod fastening for drop hammer frames, wherein the rods must withstand continual jarring movements when the hammer is operated.

The object of this invention is the production of a fastening of the character stated comprising parts of special construction and disposition including a rod having shaped end as described whereby it is believed a fastening stronger and more lasting is effected, and in the assembling of the parts of which it is practicable to expand certain members by heat which when cooling additionally grip and secure the various parts together.

In the accompanying drawings the special construction and arrangement of the parts are illustrated, and Fig. 1 represents a top plan view with the wedges removed. Fig. 2 is a side view of the recessed face of the block, with the wedges in place in the block. Fig. 3 is the end view of the block and wedges as shown in Fig. 2, the view being taken from the right hand side. Fig. 4 is an end view of the block and wedges as shown in Fig. 2, the view being taken from the left hand side. Fig. 5 is a horizontal cross-section on the broken line 5—5 of Fig. 2. Fig. 6 is a top view of the smaller and part cylindrical plug or wedge member located within the block, and Fig. 7 is a top view of the second and larger interior wedge member. Fig. 8 is a rear view of the block.

Throughout the description and drawings, the same number is used to refer to the same part.

Considering the drawings, the block 1 will be understood to represent a unitary member suitably secured in place, or it may be regarded as an integral part of the frame of a drop hammer or the like. For the purposes of this description the ends of the block 1 are marked by the numeral 2 on the right and 3 on the left. One face of the block as shown in Figs. 1 and 2 has a vertical recess 4, and the top of the block has the raised entrances 5 and 6, of the passages 7 and 8 for the wedges 9 and 10. Orifices 11 and 12 will be noted in the raised entrances 6 and 5, and such orifices may be threaded for set screws or formed to correspond with like holes in the wedges to admit cotter pins for securing the wedges.

Through the block 1 extends the passage 13 for the end of the rod 14, and as best illustrated in Fig. 5, the end of the rod 14 is formed with an upper curved recess 15, seating a cylindrical plug wedge 16, that is movable in and out within the chamber or bore 17 formed in the block in communication with the passage 13 as shown. The plug 16 has a shoulder 18, and it will be observed in Fig. 5 that when the parts are assembled the shoulder 18 projects into passage 7. It will be noted further in Fig. 5 that the end portion of the rod 14 has on the opposite side from the curving recess 15 a similar curving recess 19 seating the part cylindrical wedge 20 also illustrated in Fig. 7. The wedge 20 has a transverse cavity or recess 21 at one side of which is the shoulder 22, and it will be seen that the shoulder 22 when the parts are assembled lies in the passage 8 for the wedge 9. The corresponding curvature of the end of the rod 14, and the sides of the wedges 16 and 20 as shown in Fig. 5 is regarded by the applicant as an essential feature of this invention. In Fig. 5 it will be noted that the rod 14 cannot be displaced either to the right hand or to the left without jamming the curving surfaces together and tightening rather than loosening the fastening. Furthermore, it is practicable by means of the curving construction to adjust and fasten the rod end longitudinally in more than one position.

It is believed that the operation of this invention will best be understood from Fig. 5. The parts are put together by slipping the plug 16 to the right hand into the bore 17, which will permit the passing of the rod 14 through the block. Now, the wedge 20 may be introduced from the end 3 of the block. If, as is sometimes the practice, the block 1 is heated and the passage 13 expanded, the wedges 10 acting upon shoulder 18 of plug 16 and driving the same towards the left hand, and the wedge 9 acting upon the shoulder 22 of the interior wedge 20 and driving the same towards the right hand end 2 of the block, will clamp the end of the rod firmly and as the block cools the joint is more strongly effected. However, regardless of the holding force of this fastening, it may be readily disengaged by driving the plug 16 to the right hand and into the bore or chamber 17.

Having now described this invention and explained the mode of its operation, what I claim is:—

1. In a rod fastening of the character described, the combination with a rod having the end portion of the rod provided with a concave curving side, of a member having a passage for the rod, the said member having a cylindrical chamber formed in communication with the said passage and inclined thereto, a plug wedge movable lengthwise in the said chamber with respect to the rod, the end of the rod and one side of the wedge having curved surfaces in contact, and means for moving the plug wedge towards the end of the rod in contact with the wall of the chamber and end portion of the rod.

2. In a rod fastening of the character described, the combination with a rod having the end portion of the rod provided with a concave curving side, of a member having a passage for the rod, the said member having a chamber formed in communication with the said passage and inclined thereto, a plug wedge movable lengthwise in the said chamber, the end of the rod and one side of the wedge having curved surfaces in contact, the said plug wedge having a shoulder, the said member having a wedge-receiving passage extending at an angle with the said passage for the rod and opening through the said chamber, the said wedge-receiving passage arranged to take in the said shoulder of the plug wedge, and a wedge occupying the said wedge-receiving passage and engaging the said shoulder of the plug wedge to drive the wedge towards the end of the rod in contact with the wall of the chamber and the said rod.

3. In a rod fastening of the character described, the combination with a rod, of a member having a passage for the rod, the said rod having a curving recess in its end portion, the said member having a chamber formed in communication with the said passage for the rod and inclined thereto, a plug wedge movable lengthwise in the chamber and having a curved side fitting the said recess in the end portion of the rod, and means for moving the plug wedge towards the end of the rod in contact with the wall of the said chamber and with the said recess in the rod.

4. In a rod fastening of the character described, the combination with a rod, of a member having a passage for the rod, the said chamber having a chamber formed in communication with the said passage and inclined thereto, a plug wedge movable lengthwise in the said chamber, the end of the rod and one side of the wedge having curved surfaces in contact, means for moving the plug wedge towards the end of the rod and in contact with the wall of said chamber and the rod, the end portion of the rod having a recess whereby the end portion of the rod is reduced in size, a second wedge engaging the said recess and the passage for the rod, and means for moving the second wedge inwardly from the end of the rod.

5. In a rod fastening of the character described, the combination with a rod, of a member having a rod-receiving passage and wedge-receiving passages located on opposite sides of said rod passage, the said rod passage having a chamber formed in communication with it and inclined to it, the said rod having an end portion recessed on opposite sides, an internal plug wedge engaging a recess in the said rod and movable lengthwise in the said chamber, the end of the rod and one side of the wedge having curved surfaces in contact, the said plug wedge having a shoulder, one of the said wedge-receiving passages extending through the said chamber and arranged to take in the said shoulder of the plug wedge, a wedge engaging the said wedge-receiving passage and shoulder for moving the plug wedge towards the end of the rod, a second internal wedge engaging a recess in the rod and the rod passage and having a shoulder, one of the said wedge-receiving passages extending through the rod passage and arranged to take in the said shoulder of the said second internal wedge, and a wedge engaging the said wedge-receiving passage and shoulder to move the said second internal wedge inwardly from the end of the rod in contact with the recess of the rod and the said passage for the rod.

In testimony whereof I affix my signature.

STEPHEN PAUL.